(12) United States Patent
Banerjee et al.

(10) Patent No.: US 10,946,962 B2
(45) Date of Patent: Mar. 16, 2021

(54) BLENDED WING BODY AIRCRAFT

(71) Applicant: BOMBARDIER INC., Dorval (CA)

(72) Inventors: Siddhartho Banerjee, Saint-Laurent (CA); Alexandre Galin, Montreal (CA); Ian Chittick, Saint-Laurent (CA)

(73) Assignee: BOMBARDIER INC., Dorval (CA)

( * ) Notice: Subject to any disclaimer, the term of this patent is extended or adjusted under 35 U.S.C. 154(b) by 463 days.

(21) Appl. No.: 15/781,849

(22) PCT Filed: Nov. 30, 2016

(86) PCT No.: PCT/IB2016/057224
§ 371 (c)(1),
(2) Date: Jun. 6, 2018

(87) PCT Pub. No.: WO2017/098374
PCT Pub. Date: Jun. 15, 2017

(65) Prior Publication Data
US 2018/0362162 A1 Dec. 20, 2018

Related U.S. Application Data

(60) Provisional application No. 62/291,273, filed on Feb. 4, 2016, provisional application No. 62/265,000, filed on Dec. 9, 2015.

(51) Int. Cl.
*B64C 39/10* (2006.01)
*B64C 1/00* (2006.01)
*B64C 3/14* (2006.01)

(52) U.S. Cl.
CPC ............ *B64C 39/10* (2013.01); *B64C 1/0009* (2013.01); *B64C 3/14* (2013.01); *B64C 2039/105* (2013.01); *Y02T 50/10* (2013.01)

(58) Field of Classification Search
CPC ......... B64C 39/10; B64C 1/0009; B64C 3/14; B64C 2039/01; Y02T 50/10
See application file for complete search history.

(56) References Cited

U.S. PATENT DOCUMENTS 5,909,858 A 6/1999 Hawley
6,708,924 B2 3/2004 Page et al.
(Continued)

FOREIGN PATENT DOCUMENTS

GB 575538 A 2/1946

OTHER PUBLICATIONS

US 8,226,035 B1, 07/2012, Kismarton et al. (withdrawn)
(Continued)

*Primary Examiner* — Valentina Xavier
(74) *Attorney, Agent, or Firm* — Norton Rose Fulbright Canada LLP

(57) ABSTRACT

A blended wing body aircraft wherein at least each profile section corresponding to the normalized half-span values from 0 to 0.2 has a thickness ratio having a nominal value within the range set forth in Table 1. Also, a blended wing body aircraft wherein at least each profile section corresponding to the normalized half-span values from 0.15 to 0.3 has a normalized chord having a nominal value within the range set forth in Table 1, and wherein a ratio between a maximum thickness of the center body and the chord length along the centerline has a nominal value of at least 16%. Also, a blended wing body aircraft wherein a region of the aircraft defined by normalized half-span values from 0.1 to 0.2 has a normalized chord having a dimensionless rate of change from −3.5 to −5.1, and a thickness ratio having a rate of change from −0.27 to −0.72.

24 Claims, 10 Drawing Sheets

(56) References Cited

U.S. PATENT DOCUMENTS

| | | | |
|---|---|---|---|
| 7,644,888 | B2 | 1/2010 | Eakins et al. |
| 8,019,574 | B2 | 9/2011 | Hogan et al. |
| 8,353,478 | B1 | 1/2013 | Kismarton et al. |
| 8,408,490 | B2 | 4/2013 | McDonnell |
| 8,448,893 | B2 | 5/2013 | Tracy et al. |
| 8,608,109 | B2 | 12/2013 | Campbell |
| 2009/0065631 | A1* | 3/2009 | Zha .................. B64C 21/025 244/12.1 |
| 2010/0148010 | A1* | 6/2010 | Hunter .................. B64C 23/069 244/199.4 |
| 2018/0362161 | A1* | 12/2018 | Banerjee .................. B64C 3/14 |

OTHER PUBLICATIONS

T.E. Pambagjo et al., Aerodynamic Design of a Medium Size Blended-Wing-Body Airplane, Jan. 8-11, 2001, pp. 1-9, 39th AIAA Aerospace Sciences Meeting & Exhibit, American Institute of Aeronautics and Astronautics, USA.

PCT international Search Report and Written Opinion dated Feb. 24, 2017 re: International Application No. PCT/IB2016/057223.

Ikeda et al., Aerodynamic Performance of a Blended-Wing-Body Configuration Aircraft, 25th International Congress of the Aeronautical Sciences, Sep. 3, 2006.

Kuntawala et al., Preliminary Aerodynamic Shape Optimization of a Blended-Wing-Body Aircraft Configuration, 49th AIAA Aerospace Sciences Meeting including the New Horizons Forum and Aerospace Exposition, Jan. 4-7, 2011, AIAA 2011-642, American Institute of Aeronautics and Astronautics, United States.

PCT international Search Report and Written Opinion dated Feb. 24, 2017 re: International Application No. PCT/IB2016/057224.

Djojodihardjo et al., Hybrid Wing Body Business Jet Conceptual Design and Aerodynamic Study, International Journal of Mechanical & Mechatronics Engineering IJMME-IJENS, Apr. 2015, pp. 42-55, vol. 15 No. 02, IJENS.

Bradley, A Sizing Methodology for the Conceptual Design of Blended-Wing-Body Transports, NASA/CR-2004-213016, Sep. 2004, NASA Center for AeroSpace Information (CASI), United States.

Lyu et al., Aerodynamic Design Optimization Studies of a Blended-Wing-Body Aircraft, Journal of Aircraft, Sep.-Oct. 2014, vol. 51, No. 5, pp. 1604-1617, United States.

Gallman et al., Business Jet Wing Design Using Aerodynamic Shape Optimization, RIACS Technical Report 96.03, AIAA 34th Aerospace Sciences Meeting and Exhibit, Jan. 1996, AIAA paper 96-0554, United States.

Howe, Blended wing body airframe mass prediction, Proc Instn Mech Engrs, 2001, pp. 319-331, vol. 215 Part G, IMechE, United Kingdom.

Reist et al., Optimization of the Aerodynamic Performance of Regional and Wide-Body-Class Blended Wing-Body Aircraft, 33rd AIAA Applied Aerodynamics Conference, Jun. 22-26, 2015, American Institute of Aeronautics and Astronautics, United States.

Sharma et al., Comparative Study and CFD Analysis of Blended Wing Body (BWB), International Journal of Science Technology & Engineering, Jun. 2015, pp. 228-233, vol. 1, Issue 12, www.ijste.org, India.

Siouris et al., Study of the effects of wing sweep on the aerodynamic performance of a blended wing body aircraft, Proc. IMechE, 2007, pp. 47-55, vol. 221 Part G: IMechE, United Kingdom.

Nangia et al., Flying Wings (Blended Wing Bodies) With Aft-&-Froward-Sweep Relating Design Camber & Twist to Longitudinal Control, AIAA Atmospheric Flight Mechanics Conference, Aug. 5-8, 2002, AIAA 2002-4616, AIAA Inc., United States.

Lyu et al., RANS-based Aerodynamic Shape Optimization of a Blended-Wing-Body Aircraft, 21st AIAA Computational Fluid Dynamics Conference, Jun. 24-27, 2013, AIAA 2013-2586, AIAA Inc., United States.

Torenbeek, Blended Wing Body and All-Wing Airliners, 8th European Workshop on Aircraft Design, 2007, mp.haw-hamburg.de.

Osterheld et al., Preliminary Design of a Blended Wing Body Configuration using the Design Tool PrADO, Sep. 5, 2014, Wolfgang Heinze, Germany.

Martinez-Val et al., Optimization of Planform and Cruise Conditions of a Transport Flying Wing, 2010, Pro. IMechE vol. 224 Part G: J Aerospace Engineering, JAERO 812, Spain.

Li et al., Aerodynamic Design Methodology for Blended Wing Body Transport, Chinese Journal of Aeronautics, 2012, pp. 508-516, vol. 25, Elsevier Ltd., China.

Kouissios et al., Aircraft Fuselage Design in the Century Ahead: A Multidisciplinary Approach, Delft Science in Design 2, 2008, p. 15-34, IOS Press, Netherlands.

Sargeant et al., Stability of Hybrid-Wing-Body-Type Aircraft with Centerbody Leading-Edge Carving, Journal of Aircraft, May-Jun. 2010, pp. 970-974, vol. 47, No. 3, United States.

Agarwal et al., Assessment and Optimization of an Airplane, Aircraft Engineering and Aerospace Technology: An International Journal, 2014, pp. 147-154, vol. 86/2, Emerald Group Publishing Limited, United States.

Koster et al., Design of a Blended Wing Body UAS with Hybrid Propulsion, Proceedings of the ASME 2011 International Mechanical Engineering Congress & Exposition, IMECE2011, Nov. 11-17, 2011, ASME, United States.

Dehpanah et al., The Aerodynamic Design Evaluation of a Blended-Wing-Body Configuration, Aerospace Science and Technology, Feb. 15, 2015, pp. 96-110, vol. 43, Elsevier Masson SAS, Iran.

Ordoukhanian et al., Blended Wing Body Architecting and Design: Current Status and Future Prospects, Procedia Computer Science, 2014, pp. 619-625, vol. 28, Elsevier B.V., United States.

Qin et al., Aerodynamic Considerations of Blended Wing Body Aircraft, Progress in Aerospace Sciences, 2004, pp. 321-343, vol. 40, Elsevier Ltd., United Kingdom.

Van Dommelen et al., Conceptual Design and Analysis of Blended-Wing-Body Aircraft, Journal of Aerospace Engineering, Proc IMechE Part G: J Aerospace Engineering, 2014, pp. 2452-2474, vol. 228 (13), IMechE, United Kingdom.

Nara et al., Initial Design and Evaluation of a Novel Concept Regional Aircraft, 2010 Asia-Pacific International Symposium on Aerospace Technology, 2010, Japan.

McKinley, Jr., Blended-Wing-Body: Design Challenges for the 21st Century, Second International Conference on Nonlinear Problems in Aviation and Aerospace, 1999, pp. 473-478, vol. 2, European Conference Publications, United Kingdom.

Yongjie et al., Non-cylindrical Fuselage Structural Optimization of BWB Civil Aircraft, Key Engineering Materials, 2011, pp. 1736-1739, vols. 474-476, Trans Tech Publications, Switzerland.

Lyu, Aerodynamic Shape Optimization of a Blended-Wing Body Aircraft, 51st AIAA Aerospace sciences Meeting Including the New Horizons Forum and Aerospace Exposition, Jan. 7-10, 2013, American Institute of Aeronautics and Astronautics, Inc., United States of America.

Hansen et al., Multilevel Optimization in Aircraft Structural Design Evaluation, Computers and Structures, 2008, pp. 104-118, vol. 86, Elsevier Ltd., Germany.

Ali et al., The Effect of Canard to the Aerodynamic Behavior of Blended Wing Body Aircraft, Applied Mechanics and Materials, 2012, pp. 38-42, vol. 225, Trans Tech Publications, Switzerland.

Galea et al., The Use of Evacuation Modelling Techniques in the Design of Very Large Transport Aircraft and Blended Wing Body Aircraft, The Aeronautical Journal, Apr. 2003, pp. 207-218, United Kingdom.

Mat et al., Manufacturing Process of Blended Delta-Shaped Wing Model, Advanced Materials Research, 2014, pp. 971-974, vol. 845, Trans Tech Publications, Switzerland.

Pambagjo et al., An Alternate Configuration for a Regional Transport Airplane, Trans. Japan Soc. Aero. Space Sci., 2002, pp. 94-101, vol. 45, No. 148, The Japan Society for Aeronautical and Space Sciences, Japan.

Nasir et al., Aerodynamic, stability and flying quality evaluation on a small blended wing-body aircraft with canard foreplanes, Procedia Technology, 2014, pp. 783-791, vol. 15, Elsevier Ltd., Malaysia.

(56) References Cited

OTHER PUBLICATIONS

Le Moigne et al., Aerofoil profile and sweep optimization for a blended wing-body aircraft using a discrete adjoint method, The Aeronautical Journal, Sep. 2006, pp. 589-604, United Kingdom.
Boeing flies blended wing body research aircraft, Aircraft Engineering and Aerospace Technology, 2008, vol. 80, Issue 1, Emerald Group Publishing Limited, http://dx.doi.org/10.1108/aeat.2008.12780aaf.003.
Velicki et al., Blended wing body structural concept development, The Aeronautical Journal, Aug. 2010, pp. 513-519, vol. 114 No. 1158, United States.
Hileman et al., Aerodynamic and Aeroacoustic Three-Dimensional Design for a "Silent" Aircraft, 44th AIAA Aerospace Sciences Meeting and Exhibit, Jan. 9-12, 2006, AIAA 2006-241, American Institute of Aeronautics and Astronautics, Inc., United States.
Reist et al., Aerodynamically Optimal Regional Aircraft Concepts: Conventional and Blended Wing-Body Designs, American Institute of Aeronautics and Astronautics, United States.
Pambagjo et al., Flying Wing Concept for Medium Size Airplane, ICAS 2002 Congress, pp. 153.1-153.8, 2002, Tohoku University, Japan.
Liebeck et al., Evolution of the Revolutionary Blended-Wing-Body, Transportation Beyond 2000: Engineering Design for the Future, Sep. 26-28, 1995, pp. 431-459, NASA Langley Research Center, United States.
Djojodihardjo et al., Conceptual Design and Aerodynamic Study of Joined-Wing Business Jet, 28th International Congress of the Aeronautical Sciences, ICAS2012, 2012, Malaysia.
Mulyanto et al., Conceptual Design of Blended Wing Body Business Jet Aircraft, Journal of KONES Powertrain and Transport, 2013, pp. 299-306, vol. 20, No. 4, Indonesia.
Craig L. Nickol, Hybrid Wing Body Configuration Scaling Study, NASA Langley Research Center, Jan. 9, 2012, American Institute of Aeronautics and Astronautics, United States.
Reist et al., Optimization of the Aerodynamic Performance of a Blended Wing-Body Regional Aircraft, Jun. 22-26, 2015, American Institute of Aeronautics and Astronautics, United States.
Meheut et al., Aerodynamic Shape Optimizations of a Blended Wing Body Configuration for Several Wing Platforms, 30th AIAA Applied Aerodynamics Conference, Jun. 25-28, 2012, AIAA 2012-3122, American Institute of Aeronautics and Astronautics, United States.
Hileman et al., Airframe Design for "Silent Aircraft", 45th AIAA Aerospace Sciences Meeting and Exhibit, Jan. 8-11, 2007, AIAA 2007-453, American Institute of Aeronautics and Astronautics, United States.
Georgia Tech Research Institute, Integrated Modeling and Verification of Hybrid Wing Low Noise Subsonic Transport, DHC Engineering Empirical Systems Aerospace, Cal Poly, San Luis Obispo, accessed on Sep. 17, 2015.
Dieter Scholz, Blended Wing Body Aircraft—From Conceptual Design to Flight Testing, Presentation for EWADE, May 30-Jun. 2, 2007, Hamburg University of Applied Sciences, Germany.
Hakim et al., Conceptual Design of Blended-Wing-Body Business Jet, Faculty of Mechanical and Aerospace Engineering, Institut Teknologi Bandung, Indonesia, accessed on Sep. 17, 2015.
Leibeck, Design of the Blended-Wing-Body Subsonic Transport, 40th AIAA Aerospace Sciences Meeting & Exhibit, Jan. 14-17, 2002, AIAA-2002-0002, American Institute of Aeronautics and Astronautics, United States.
Frota et al., NACRE, New Aircraft Concepts Research, Final Activity Report, 2005-2010, Sixth Framework Programme Priority 4 Aeronautics and Space, Integrated Project No. 516068, FP6-2003-Aero-1, 2010, NACRE Consortium.
Nikolai Kresse, VELA—Very Efficient Large Aircraft: An FP5 project to enhance the knowledge on BWB configurations, VELA, Aeronautic Days, 2006, Issue 2, Ref. PR0606778, Vienna.
Rao et al., AHEAD: Advanced Hybrid Engines for Aircraft Development (ACP1-GA-2011-284636), accessed on Sep. 23, 2015.
Liebeck, Design of the Blended Wing Body Subsonic Transport, Journal of Aircraft, vol. 41, No. 1, Jan.-Feb. 2004, United States.

* cited by examiner

US 10,946,962 B2

BLENDED WING BODY AIRCRAFT

This application is a national phase application under 35 U.S.C. 371 of International Patent Application No. PCT/IB2016/057224 filed on Nov. 30, 2016, which claims priority from U.S. provisional application No. 62/265,000 filed Dec. 9, 2015 and U.S. provisional application No. 62/291,273 filed Feb. 4, 2016, the entire contents of both of which are incorporated by reference herein.

TECHNICAL FIELD

The application relates generally to aircraft profiles and, more particularly, to the profile of a blended wing body aircraft.

BACKGROUND OF THE ART

A number of blended wing body designs are known, but such are typically designed for relatively large aircraft, for example seating 200 people or more. Such designs cannot simply be scaled down for smaller aircraft, as the resulting height would not be suitable to accommodate passengers.

Typical blended wing body aircraft have a relatively large wetted area, which may impede aerodynamic efficiency.

SUMMARY

In one aspect, there is provided a blended wing body aircraft comprising: an airfoil shaped center body; and a pair of wings extending from opposed sides of the center body; wherein the aircraft has a span direction, and a maximum half-span length defined along the span direction from a centerline of the center body to a tip of one of the wings; wherein a normalized half-span value for each profile section of the aircraft is defined by a ratio between a distance along the span direction from the centerline to the profile section, and the maximum half-span length; wherein each profile section of the aircraft has a thickness ratio defined by a ratio between a thickness of the profile section and a chord length of the profile section, the thickness ratio having a nominal value within the thickness ratio range set forth in Table 1 for at least each profile section corresponding to the normalized half-span values from 0 to 0.2.

This blended wing body aircraft may have any of the following characteristics, or any combination of the following characteristics:

the aircraft has a maximum chord length defined longitudinally by the center body, and wherein each profile section of the aircraft has a normalized chord defined by a ratio between the chord length of the profile section and the maximum chord length, the normalized chord having a nominal value within the normalized chord range set forth in Table 1 for at least each profile section corresponding to the normalized half-span values from 0.15 to 0.3;

the nominal value of the normalized chord is within the normalized chord range set forth in Table 1 for at least each profile section corresponding to the normalized half-span values from 0.15 to 0.5;

the nominal value of the normalized chord is within the normalized chord range set forth in Table 1 for all the normalized half-span values;

the nominal value of the thickness ratio is within the thickness ratio range set forth in Table 1 for at least each profile section corresponding to the normalized half-span values from 0 to 0.3;

the nominal value of the thickness ratio is within the thickness ratio range set forth in Table 1 for all the normalized half-span values;

the nominal value of the normalized chord is within the normalized chord range set forth in Table 1 and the nominal value of the thickness ratio is within the thickness ratio range set forth Table 1 for all the normalized half-span values;

the nominal value of the thickness ratio is within the thickness ratio range set forth in Table 2 or in Table 3 for at least each profile section corresponding to the normalized half-span values from 0 to 0.2;

the nominal value of the normalized chord is within the normalized chord range set forth in Table 2 or in Table 3 for at least each profile section corresponding to the normalized half-span values from 0.15 to 0.3 the center body includes an interior cabin having a usable volume of at most 4500 ft$^3$;

the interior cabin has a maximum length defined longitudinally and a maximum width defined perpendicularly to the maximum length, and a cabin aspect ratio of the maximum length to the maximum width is at most 4;

a reference line is defined perpendicularly to a direction defined by a maximum thickness of the center body at a mid-point of the maximum thickness. The reference line extends fore-to-aft in relation to the center body. A part of each of the wings has a leading edge located a first distance below the reference line, the first distance being measured along the direction defined by the maximum thickness and corresponding to at least 10% of the maximum thickness; and/or a reference line is defined perpendicularly to a direction defined by a maximum thickness of the center body at a mid-point of the maximum thickness. The reference line extends fore-to-aft in relation to the center body. Each profile section of the aircraft has a leading edge having a normalized height with respect to the reference line, the normalized height corresponding to a ratio of a distance from the reference line being measured along the direction defined by the maximum thickness to the maximum thickness. The normalized height has a nominal value within the leading edge normalized height range set forth in Table 4 for at least each profile section corresponding to the normalized half-span values from 0 to 0.3.

In another aspect, there is provided a blended wing body aircraft comprising: an airfoil shaped center body; and a pair of wings extending from opposed sides of the center body; wherein the aircraft has a maximum chord length defined longitudinally by the center body; wherein the aircraft has a span direction, and a maximum half-span length defined along the span direction from a centerline of the center body to a tip of one of the wings; wherein a normalized half-span value for each profile section of the aircraft is defined by a ratio between a distance along the span direction from the centerline to the profile section, and the maximum half-span length; wherein each profile section of the aircraft has a normalized chord defined by a ratio between a chord length of the profile section and the maximum chord length, the normalized chord having a nominal value within the normalized chord range set forth in Table 1 for at least each profile section corresponding to the normalized half-span values from 0.15 to 0.3; and wherein a ratio between a maximum thickness of the center body at the centerline and the chord length along the centerline has a nominal value of at least 16%.

This blended wing body aircraft may have any of the following characteristics, or any combination of the following characteristics:

the nominal value of the normalized chord is within the normalized chord range set forth in Table 1 for at least each profile section corresponding to the normalized half-span values from 0.15 to 0.5;

the nominal value of the normalized chord is within the normalized chord range set forth in Table 1 for all the normalized half-span values;

the nominal value of the normalized chord is within the normalized chord range set forth in Table 2 or Table 3 for at least each profile section corresponding to the normalized half-span values from 0.15 to 0.3;

the center body includes an interior cabin having a usable volume of at most 4500 ft$^3$;

the interior cabin has a maximum length defined longitudinally and a maximum width defined perpendicularly to the maximum length, and a cabin aspect ratio of the maximum length to the maximum width is at most 4;

a reference line is defined perpendicularly to a direction defined by a maximum thickness of the center body at a mid-point of the maximum thickness. A part of each of the wings has a leading edge located a first distance below the reference line, the first distance being measured along the direction defined by the maximum thickness and corresponding to at least 10% of the maximum thickness; and/or a reference line is defined perpendicularly to a direction defined by a maximum thickness of the center body at a mid-point of the maximum thickness. The reference line extends fore-to-aft in relation to the center body. Each profile section of the aircraft has a leading edge having a normalized height with respect to the reference line, the normalized height corresponding to a ratio of a distance from the reference line being measured along the direction defined by the maximum thickness to the maximum thickness. The normalized height has a nominal value within the leading edge normalized height range set forth in Table 4 for at least each profile section corresponding to the normalized half-span values from 0 to 0.3.

In a further aspect, there is provided a blended wing body aircraft comprising: an airfoil shaped center body; and a pair of wings extending from opposed sides of the center body; wherein the aircraft has a maximum chord length defined longitudinally by the center body; wherein the aircraft has a span direction, and a maximum half-span length defined along the span direction from a centerline of the center body to a tip of one of the wings; wherein a normalized half-span value for each profile section of the aircraft is defined by a ratio between a distance along the span direction from the centerline to the profile section, and the maximum half-span length; wherein a region of the aircraft defined by normalized half-span values from 0.1 to 0.2 has a normalized chord having a dimensionless rate of change from −3.5 to −5.1, the normalized chord being defined by a ratio of a chord length within the region to the maximum chord length, the rate of change of the normalized chord length defined by a dimensionless ratio of a variation in the normalized chord to a variation in the normalized half span value; and wherein the region of the aircraft defined by the normalized half-span values from 0.1 to 0.2 has a thickness ratio having a rate of change from −0.27 to −0.72, the thickness ratio defined by a ratio of the thickness to the chord length of a same profile section, the rate of change of the thickness ratio defined by a dimensionless ratio of a variation in the thickness ratio to a variation in the normalized half span value.

This blended wing body aircraft may have any of the following characteristics, or any combination of the following characteristics:

the dimensionless rate of change of the normalized chord in the region defined by the normalized half-span values from 0.1 to 0.2 is from −4.3 to −5.1;

the dimensionless rate of change of the normalized chord in a region defined by the normalized half-span values from 0.1 to 0.3 is at least −2.4;

the dimensionless rate of change of the thickness ratio in the region defined by the normalized half-span values from 0.1 to 0.2 is from −0.49 to −0.72;

the dimensionless rate of change of the thickness ratio in a region defined by the normalized half-span values from 0.1 to 0.3 is at least −0.28;

the center body includes an interior cabin has a usable volume of at most 4500 ft$^3$;

the interior cabin has a maximum length defined longitudinally and a maximum width defined perpendicularly to the maximum length, and a cabin aspect ratio of the maximum length to the maximum width is at most 4; and/or a reference line is defined perpendicularly to a direction defined by a maximum thickness of the center body at a mid-point of the maximum thickness. The reference line extends fore-to-aft in relation to the center body. A part of each of the wings has a leading edge located a first distance below the reference line, the first distance being measured along the direction defined by the maximum thickness and corresponding to at least 10% of the maximum thickness.

DESCRIPTION OF THE DRAWINGS

Reference is now made to the accompanying figures in which.

DETAILED DESCRIPTION

In the present specification, including claims, it is understood that a range of values formulated as "from X to Y" is inclusive, i.e. includes the values X and Y.

Blended wing body designs are sometimes also referred to as "hybrid wing body" designs. In the present specification, including claims, it is understood that the term "blended wing body" encompasses designs which are sometime referred to as "hybrid wing body" designs.

Figure 1:
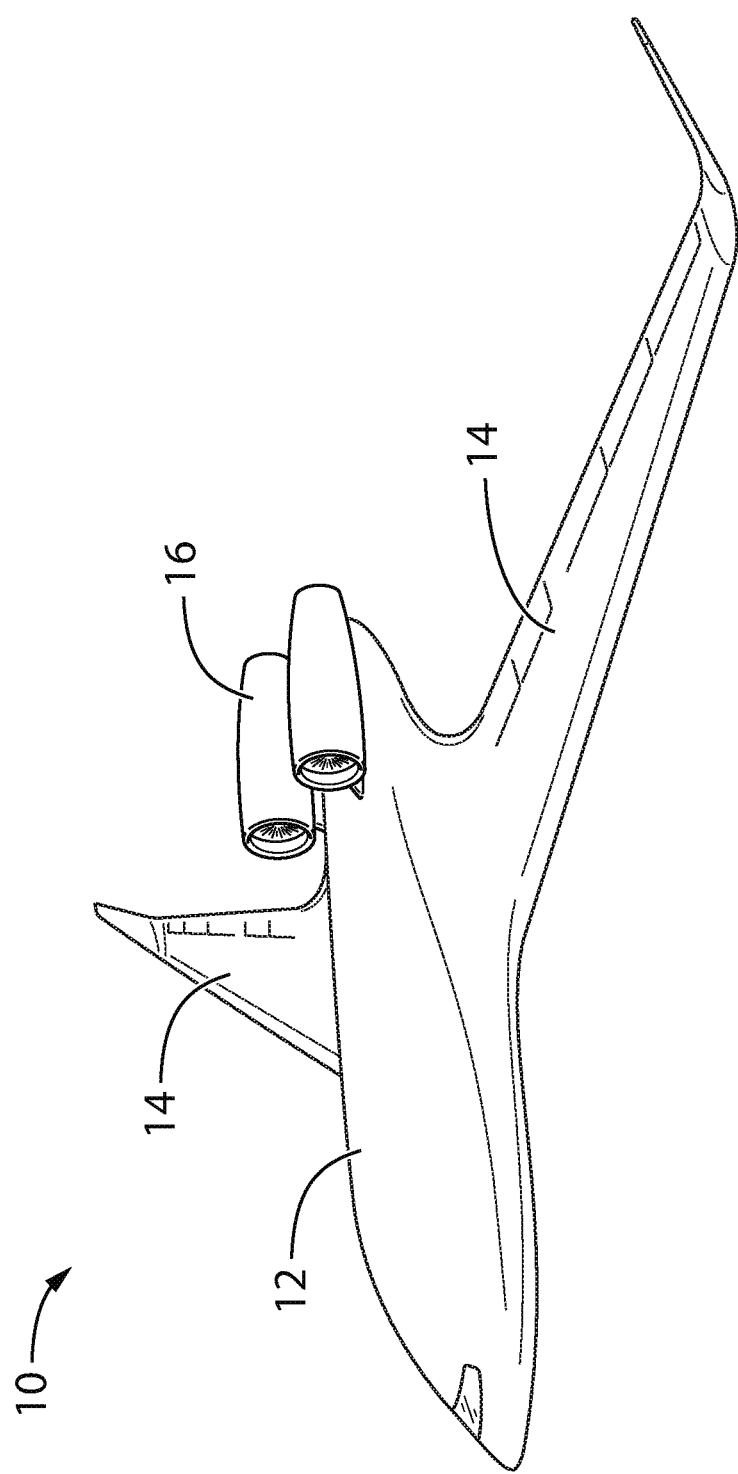
FIG. 1 is a schematic isometric view of a blended wing aircraft according to a particular embodiment.

Referring to the drawings and more particularly to FIG. 1, a blended wing body aircraft is shown at 10. The aircraft 10 has a center body 12 having a fore end at which a cockpit is located, and an opposed aft end. The center body 12 is airfoil-shaped such as to be able to generate lift. In the embodiment shown, the aircraft 10 is tailless; alternately, a tail structure may be provided at the aft end of the center body 12 and/or a canard may be provided at the fore end of the center body 12. Wings 14 project laterally from opposite sides of the center body 12. The aircraft 10 has engines 16 mounted to the aft end of the center body 12; alternately, the engines 16 could be mounted on the wings 14 or they could be fully or partially embedded within the center body 12 or the wings 14. The aircraft 10 is shown as a jet-engine aircraft, but may also be a propeller aircraft.

Figure 4:
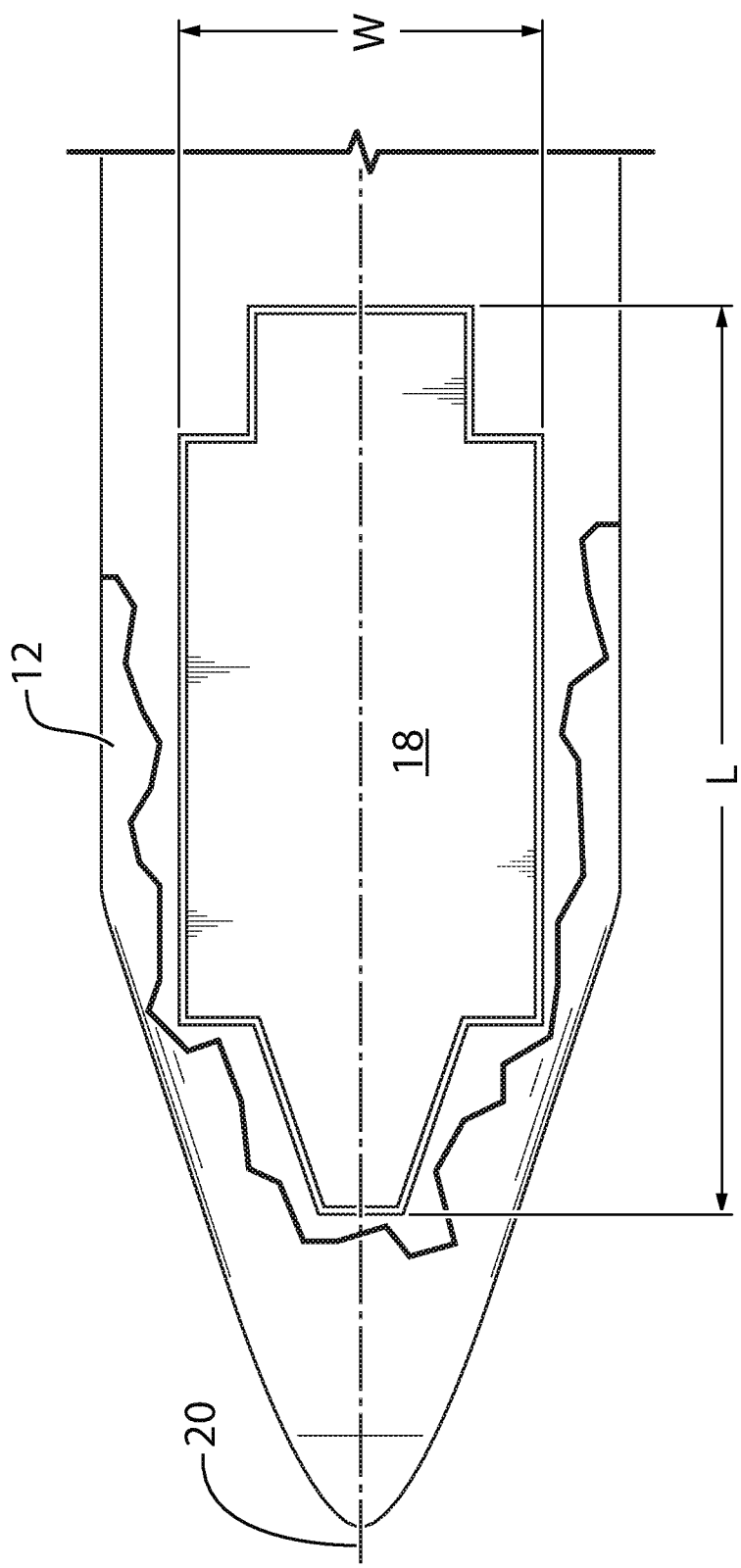
FIG. 4 a schematic top cross-sectional view of a cabin of the aircraft of FIG. 1, in accordance with a particular embodiment.

Referring to FIG. 4, the center body 12 includes an interior cabin 18 for receiving payload, for example passengers. As used herein, the term "passengers" includes both crew and non-crew individuals located on-board the aircraft 10. In addition, the term "passengers" includes both civilian and military travellers. The cabin 18 has a maximum length L defined along a longitudinal centerline 20 of the center body 12 and a maximum width W defined perpendicularly to the maximum length. The blended wing body shape allows for the center body 12 to have a greater width than that of a tubular fuselage aircraft having a similar cabin volume, such as to be able to accommodate for example two or more aisles of passenger seating or two side-by-side sections as per the exemplary embodiment shown.

The cabin 18 has a usable volume which is defined as the sum of stand-up volume and additional volume situated above the cabin floor, excluding the pilot compartment. The stand-up volume is defined as the volume having a flat floor and at least a predetermined height. In a particular embodiment, the predetermined height is 72 inches or higher. In a particular embodiment, the additional volume has a minimum height of 50 inches at its lowest edges, and a gradient between the minimum height and the height of the stand-up volume of at least 0.73 inches in height per 1.0 inch of width. It is understood that the particular values provided are examples only and that other appropriate values may be used.

In a particular embodiment, the cabin 18 according to the present invention has a usable volume selected from the following values: at most 4500 ft$^3$, at most 4000 ft$^3$, from 1500 ft$^3$ to 4000 ft$^3$, from 1500 ft$^3$ to 4500 ft$^3$, from 2000 ft$^3$ to 4000 ft$^3$, and from 2000 ft$^3$ to 4500 ft$^3$; and the cabin aspect ratio, which is defined as the maximum length to the maximum width (L/W) of the cabin, is selected from the following values: at most 4, at most 3.5, from 2 to 4, and from 2 to 3.5. Blended wing body aircrafts with such cabin aspect ratios are typically designed with much larger cabin usable volumes, and their shape cannot simply be scaled down to a smaller volume because the resulting cabin height would be insufficient to accommodate passengers.

In a particular embodiment, the cabin 18 according to the present invention has a usable volume of approximately 2400 ft$^3$, with a ratio of stand-up volume to total usable volume of at least 50%; in a particular embodiment, the ratio of stand-up volume to total usable volume is about 80%. Such a cabin preferably has a flat cabin floor area of at least 0.13 ft$^2$ per 1 ft$^3$ of usable volume; in a particular embodiment, the flat cabin floor area is at least 0.15 ft$^2$ per 1 ft$^3$ of usable volume. In a particular embodiment, these ratios of stand-up volume to total usable volume and/or these minimum ratios of flat floor area to usable volume may be applied to any of the cabin volumes mentioned above. On larger aircraft, the flat floor area could be arranged in multiple decks.

In a particular embodiment, the flat cabin floor has a pitch angle of at most 3.5 degrees in typical cruise flight condition or on ground excluding taxi, take-off and landing phases.

In a particular embodiment with an airline interior, the usable volume of the cabin is selected to accommodate from 50 to 70 passengers. In a particular embodiment, the usable volume of the airline cabin is selected to accommodate about 50 passengers. In a particular embodiment with a business aircraft interior, the usable volume of the cabin is selected to accommodate from 8 to 18 passengers. In a particular embodiment, the usable volume of the business aircraft cabin is selected to accommodate about 14 passengers.

The aircraft 10 is particularly shaped to be able to obtain the desired combination of cabin aspect ratio and usable volume while maintaining aerodynamic efficiency. The outer (wetted) surfaces of the aircraft are configured such as to reduce the wetted area with respect to more traditional blended wing body shapes; the reduction in wetted area reduces friction drag. The wetted area is reduced while simultaneously realizing induced drag and trim drag benefits and while aiming to maintain a wave drag comparable to or better than that of a conventional aircraft having a tubular fuselage.

Figure 2:
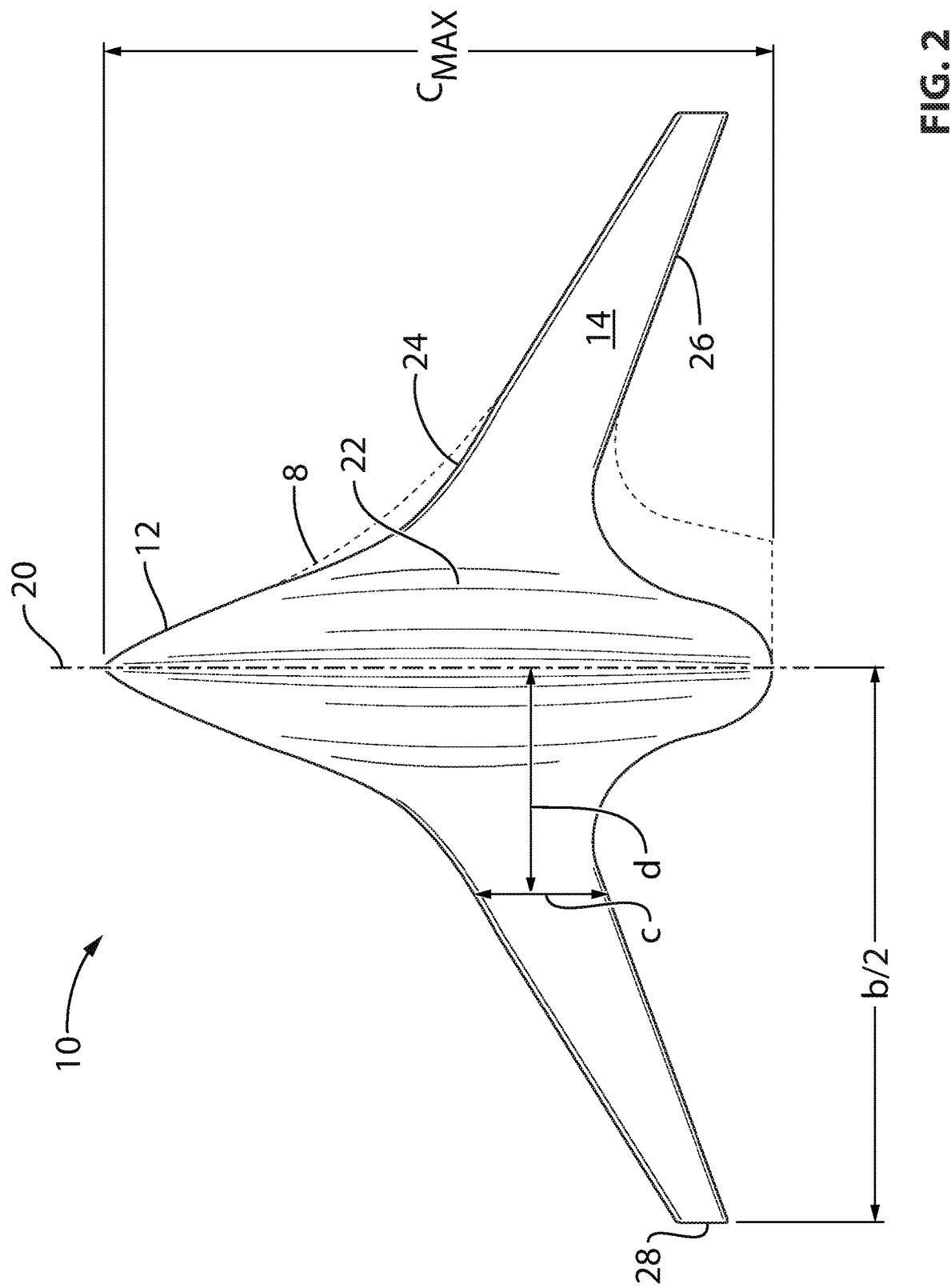
FIG. 2 is a schematic top view of wetted surfaces of the aircraft of FIG. 1, in accordance with a particular embodiment.
Figure 3:
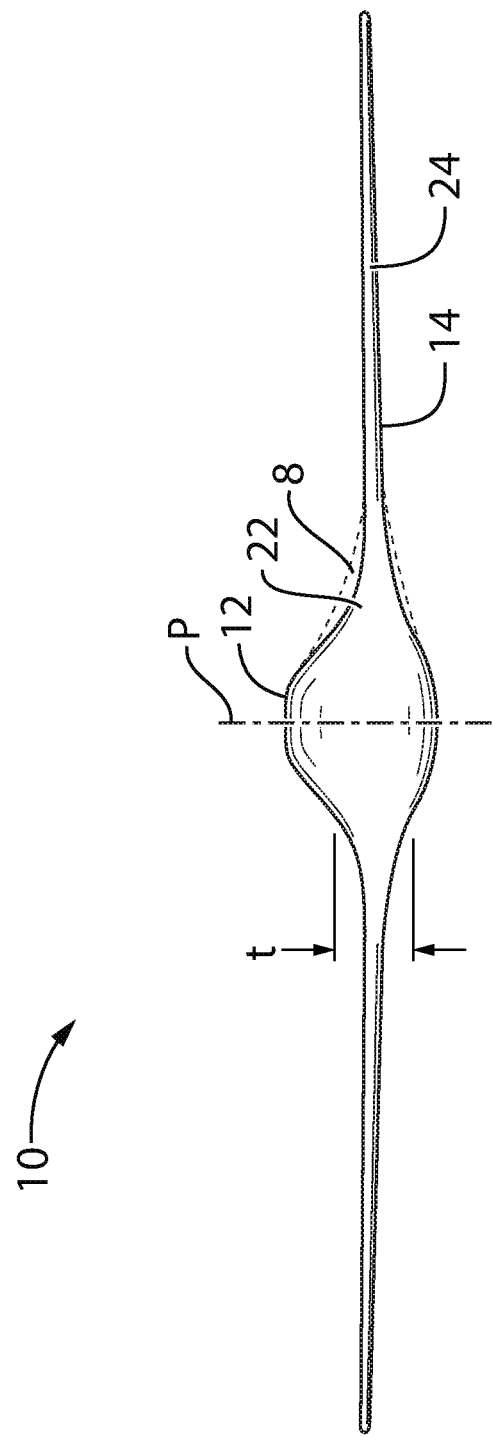
FIG. 3 is a schematic front view of the wetted surfaces of FIG. 2.

Referring to FIGS. 2-3, in a particular embodiment the reduction of wetted area is achieved by a "carving out" of the leading edge 24 and trailing edge 26 in the transition zone 22 from the center body 12 to the wing 14, as compared to more traditional blended wing body shapes (an example of which is shown at 8 in dotted lines). Accordingly, the chord length (C) (FIG. 2) and thickness (t) (FIG. 3) of the aircraft 10 are reduced more aggressively upon transition from the center body 12 to the wings 14; the resulting profile defines a tridimensional shape which features a relatively voluminous lift-creating center body 12 which quickly transitions to wings 14 which may have a shape similar to that of wings of a conventional aircraft with a tubular fuselage. The relative thickness (height) at the cabin in relation to the wing thickness is larger than more traditional blended wing body shapes.

The reduced wetted area results in an increased wetted aspect ratio. The wetted aspect ratio of the combination of the wings 14 and center body 12 is defined as follows:

$$\frac{b^2}{S_{wet}}$$

where b is the maximum wing span measured without considering winglets and other wing tip devices, and $S_{wet}$ is the wetted area of the combination of the wings 14 and center body 12. The wetted area is measured without taking into consideration elements added to the body 12 and/or wings 14, such as winglets, engine nacelles, pylons, etc.

In a particular embodiment, the combination of the wings 14 and center body 12 has a wetted aspect ratio selected from the following values: from 1.7 to 2.8; from 1.9 to 2.7; from 2.1 to 2.7; about 2.4.

In a particular embodiment, the aspect ratio of the combination of the wings 14 and center body 12, which is defined as $$\frac{b^2}{A}$$

where A is the projected area of the combination of the wings 14 and center body 12, has a value selected from the following values: from 4.5 to 7.2; from 5.1 to 7.1; from 5.7 to 7.1; about 6.3.

In a particular embodiment, the aircraft 10 is configured for typical flight at Mach 0.85 with a capability to cruise at Mach 0.90. The aircraft 10 may alternately be configured for flight at other adequate speeds.

A shape or profile of the aircraft 10 in accordance with particular embodiments will be described herein. Although the parameters described are particularly suited for an aircraft having a usable volume as described above, it is understood that these parameters may also be used in aircraft having larger usable volumes; in sufficiently large usable volumes, the profile described may allow for a cabin height sufficient to create multiple levels, i.e. vertically superposed spaces for receiving passengers.

The aircraft 10 can be defined by profile sections which correspond to "slices" of the aircraft shape taken parallel to a longitudinal plane of symmetry P (see FIG. 3) of the center body 12; these slices reveal the airfoil profile of each section of the aircraft 10. Referring to FIG. 2, the position of each profile section with respect to the centerline 20 is defined by a normalized half span which corresponds to the ratio between a distance (d) from the centerline to that section measured along the direction of the span, and the maximum half-span length (b/2) of the aircraft 10 which is measured from the centerline 20 to the wing tip 28 (excluding winglet and other wing tip devices). The normalized half-span value $$\left(\frac{d}{b/2}\right)$$

is expressed herein has a number varying from 0 (at the centerline 20) to 1.0 (at the wing tip 28), but could alternately be expressed as a % of the maximum half-span length.

Still referring to FIG. 2, each profile section of the aircraft 10 is characterized by a normalized chord which is defined by a ratio between the chord length (C) of that section and the maximum chord length ($C_{MAX}$) of the aircraft. The normalized chord value $$\left(\frac{C}{C_{MAX}}\right)$$

is expressed herein as a % of the maximum chord length, but could alternately be expressed by a number having a maximum value of 1.0 (at the section defining the maximum chord length, typically at centerline 20).

Referring to FIG. 3, each profile section of the aircraft 10 is also characterized by a thickness ratio, which corresponds to a ratio between the corresponding thickness (t) and chord length (C) (FIG. 2) of that section. The thickness ratio value (t/C) is expressed herein as a % of the chord length, but could alternately be expressed by an equivalent numerical value (e.g. decimal number). The thickness (t) of each airfoil shape (center body, wings) is measured perpendicularly to its chord line.

Figure 5:
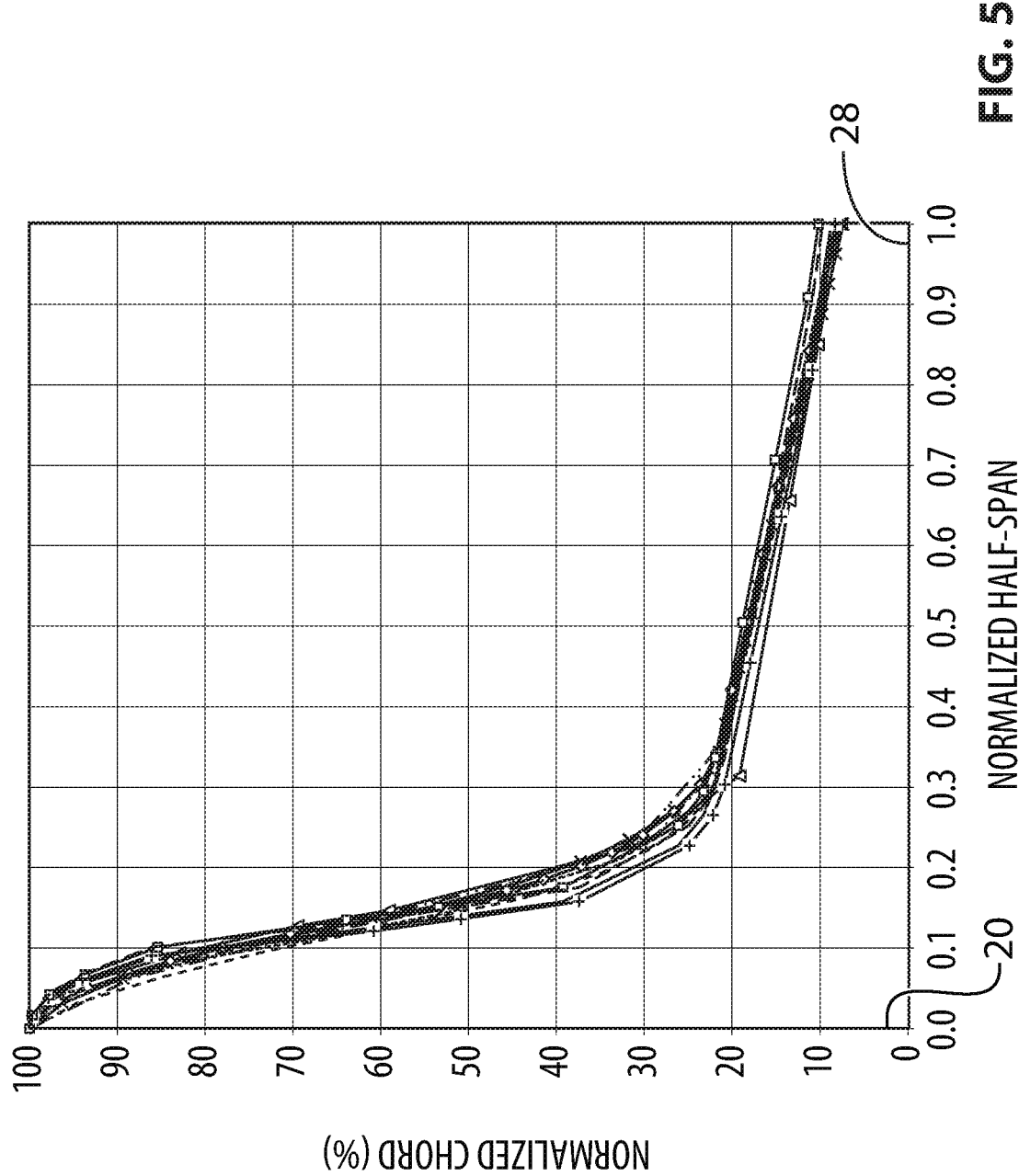
FIG. 5 is a graph showing examples of normalized chord distribution as a function of normalized half-span for the aircraft of FIG. 1, in accordance with particular embodiments.
Figure 6:
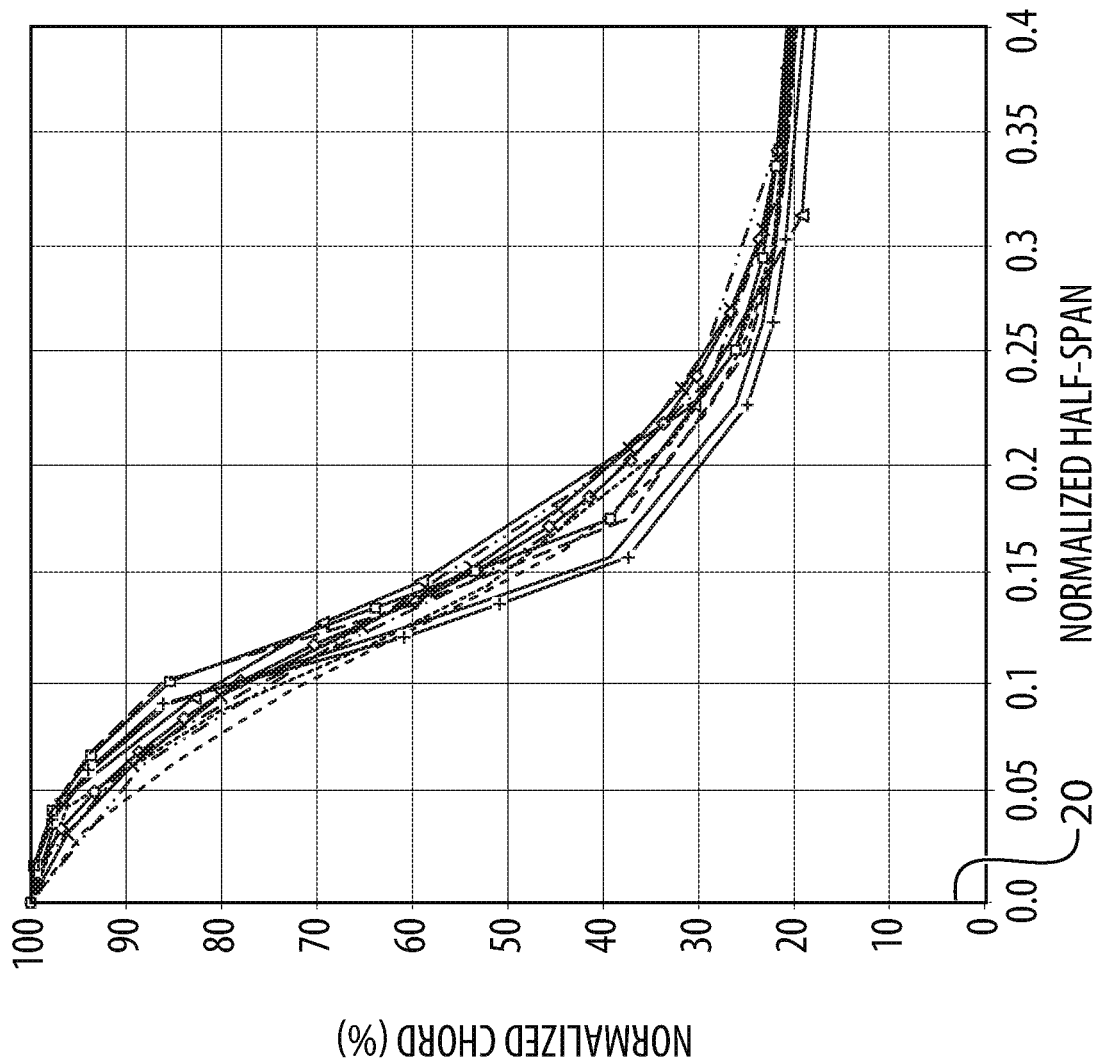
FIG. 6 is an enlarged portion of the graph of FIG. 5.
Figure 7:
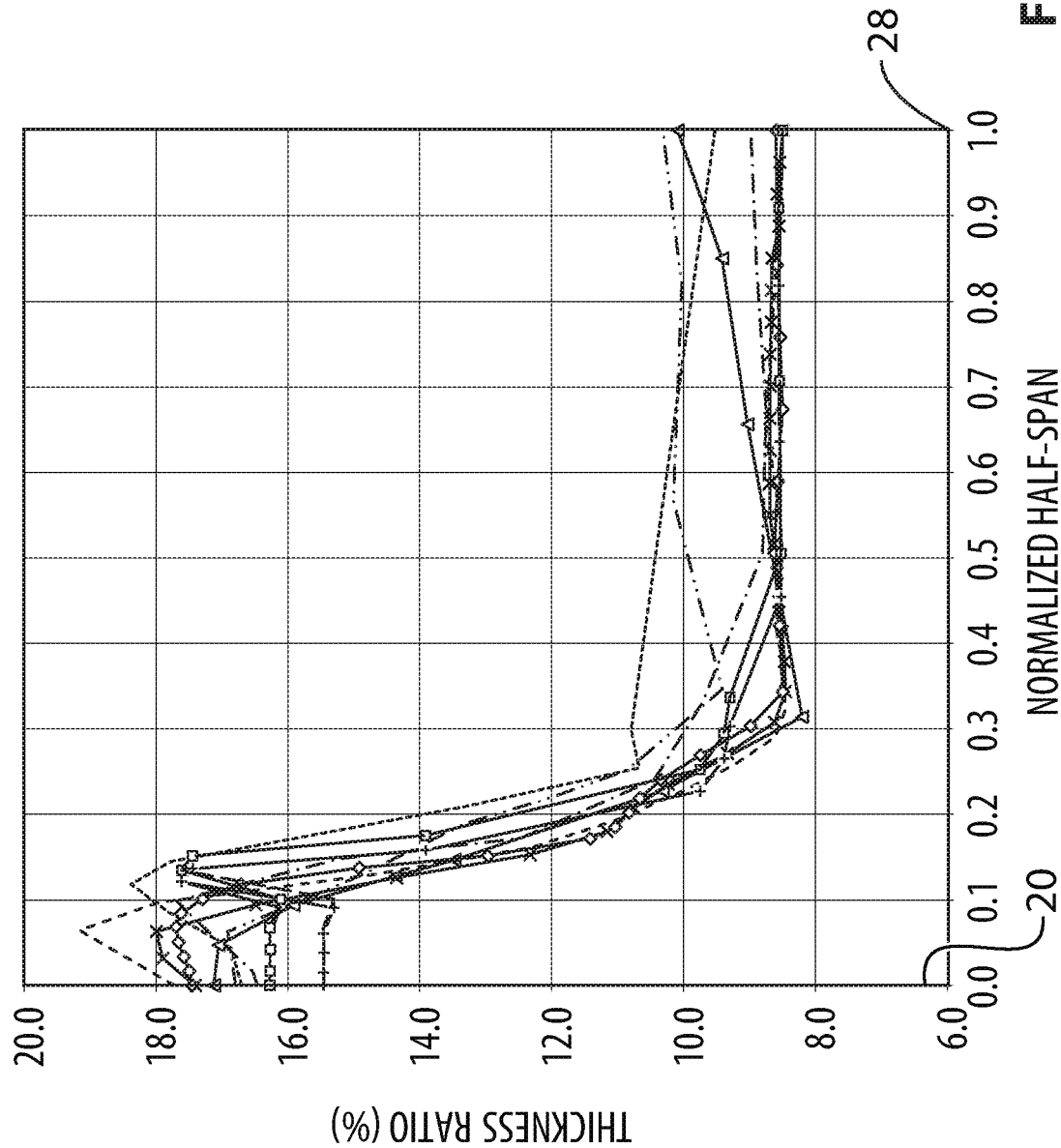
FIG. 7 is a graph showing examples of thickness ratio distribution as a function of normalized half-span for the aircraft of FIG. 1, in accordance with particular embodiments.
Figure 8:
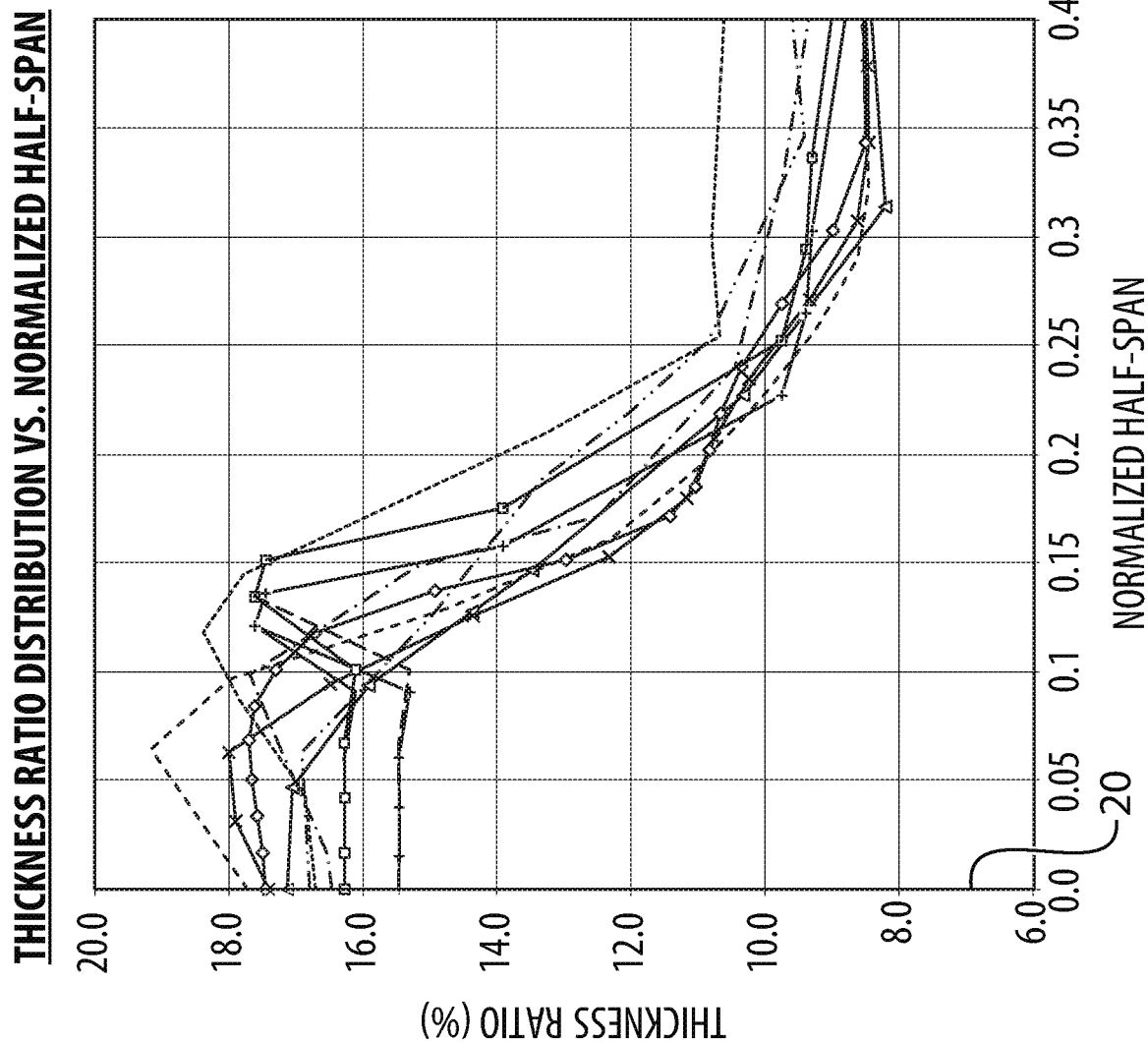
FIG. 8 is an enlarged portion of the graph of FIG. 7.

FIGS. 5-6 show the normalized chord distribution as a function of the distance from the center line 20 as defined by the normalized half-span, and FIGS. 7-8 show the thickness ratio distribution as a function of the distance from the center line 20 as defined by the normalized half-span, for a few aircrafts 10 according to particular embodiments. Table 1 below sets forth value ranges for the normalized chord and the thickness ratio according to a particular embodiment, which encompass but are not limited to the distributions of FIGS. 5-8:

TABLE 1

| Normalized half-span value | Normalized chord range (%) | | thickness ratio range (%) | |
|---|---|---|---|---|
| (dimensionless) | From | To | From | To |
| 0.000 | 100.0 | 100.0 | 15.2 | 19.4 |
| 0.050 | 85.4 | 100.0 | 15.0 | 19.4 |
| 0.100 | 58.0 | 96.0 | 14.5 | 19.2 |
| 0.125 | 44.5 | 92.0 | 12.2 | 19.0 |
| 0.150 | 31.0 | 78.5 | 9.8 | 18.7 |
| 0.175 | 26.0 | 65.0 | 9.0 | 18.2 |
| 0.200 | 23.0 | 51.0 | 8.7 | 16.5 |
| 0.250 | 20.0 | 34.0 | 8.3 | 11.8 |
| 0.300 | 17.9 | 28.0 | 8.1 | 11.3 |
| 0.350 | 17.0 | 24.5 | 8.0 | 11.1 |
| 0.400 | 16.0 | 23.2 | 8.0 | 11.0 |
| 0.500 | 14.2 | 21.3 | 8.0 | 10.9 |
| 0.600 | 12.5 | 19.5 | 8.0 | 10.9 |
| 0.700 | 10.7 | 17.5 | 8.0 | 10.9 |
| 0.800 | 9.0 | 15.7 | 8.0 | 10.9 |
| 0.900 | 7.3 | 13.9 | 8.0 | 10.9 |
| 1.000 | 5.5 | 12.0 | 8.0 | 10.9 |

Table 2 below sets forth smaller value ranges for the normalized chord and the thickness ratio according to another particular embodiment, which encompass at least some of the distributions of FIGS. 5-8:

TABLE 2

| Normalized half-span value | Normalized chord range (%) | | thickness ratio range (%) | |
|---|---|---|---|---|
| (dimensionless) | From | To | From | To |
| 0.000 | 100.0 | 100.0 | 15.2 | 18.4 |
| 0.050 | 85.4 | 100.0 | 15.2 | 19.4 |
| 0.100 | 61.1 | 94.0 | 14.9 | 19.1 |
| 0.125 | 49.0 | 87.0 | 13.1 | 18.8 |
| 0.150 | 35.0 | 70.0 | 11.2 | 18.4 |
| 0.175 | 29.0 | 55.1 | 9.3 | 17.6 |
| 0.200 | 25.5 | 43.3 | 8.9 | 15.2 |
| 0.250 | 21.0 | 31.9 | 8.5 | 11.4 |
| 0.300 | 18.4 | 26.8 | 8.2 | 11.1 |
| 0.350 | 17.5 | 23.7 | 8.1 | 11.0 |
| 0.400 | 16.5 | 22.7 | 8.1 | 10.9 |
| 0.500 | 14.7 | 20.8 | 8.1 | 10.7 |
| 0.600 | 13.0 | 19.0 | 8.1 | 10.7 |
| 0.700 | 11.2 | 17.0 | 8.1 | 10.7 |
| 0.800 | 9.5 | 15.2 | 8.1 | 10.7 |
| 0.900 | 7.8 | 13.4 | 8.1 | 10.7 |
| 1.000 | 6.0 | 11.5 | 8.1 | 10.7 |

Table 3 below sets forth other smaller value ranges for the normalized chord and the thickness ratio according to another particular embodiment, which encompass at least some of the distributions of FIGS. 5-8:

TABLE 3

| Normalized half-span value | Normalized chord range (%) | | thickness ratio range (%) | |
|---|---|---|---|---|
| (dimensionless) | From | To | From | To |
| 0.000 | 100.0 | 100.0 | 15.4 | 16.8 |
| 0.050 | 89.0 | 98.0 | 15.4 | 17.5 |
| 0.100 | 68.0 | 91.0 | 15.0 | 18.0 |
| 0.125 | 53.5 | 82.0 | 13.3 | 18.0 |
| 0.150 | 37.5 | 65.0 | 11.4 | 17.8 |
| 0.175 | 31.2 | 52.1 | 9.5 | 17.1 |
| 0.200 | 27.2 | 42.0 | 9.1 | 14.7 |
| 0.250 | 22.5 | 31.0 | 8.8 | 11.2 |
| 0.300 | 20.0 | 25.0 | 8.6 | 10.5 |
| 0.350 | 19.0 | 22.5 | 8.5 | 10.2 |
| 0.400 | 18.0 | 21.5 | 8.5 | 10.1 |
| 0.500 | 16.1 | 19.5 | 8.5 | 10.1 |
| 0.600 | 14.3 | 17.7 | 8.5 | 10.1 |
| 0.700 | 12.4 | 15.9 | 8.5 | 10.1 |
| 0.800 | 10.6 | 14.0 | 8.5 | 10.1 |
| 0.900 | 8.7 | 12.0 | 8.5 | 10.1 |
| 1.000 | 7.0 | 10.0 | 8.5 | 10.1 |

In a particular embodiment, the normalized chords have nominal values within the normalized chord ranges set forth in Table 1 for at least the profile sections having normalized half-span values from 0.15 to 0.3; in a particular embodiment, the normalized chords have nominal values within the normalized chord ranges set forth in Table 1 for at least the profile sections having normalized half-span values from 0.15 to 0.5. In a particular embodiment, the normalized chords have nominal values within the normalized chord ranges set forth in Table 1 for the entire aircraft (i.e. normalized half-span from 0 to 1.0).

In a particular embodiment, the normalized chords have nominal values within the normalized chord ranges set forth in Table 2 for at least the profile sections having normalized half-span values from 0.15 to 0.3; in a particular embodiment, the normalized chords have nominal values within the normalized chord ranges set forth in Table 2 for at least the profile sections having normalized half-span values from 0.15 to 0.5. In a particular embodiment, the normalized chords have nominal values within the normalized chord ranges set forth in Table 2 for the entire aircraft (i.e. normalized half-span from 0 to 1.0).

In a particular embodiment, the normalized chords have nominal values within the normalized chord ranges set forth in Table 3 for at least the profile sections having normalized half-span values from 0.15 to 0.3; in a particular embodiment, the normalized chords have nominal values within the normalized chord ranges set forth in Table 3 for at least the profile sections having normalized half-span values from 0.15 to 0.5. In a particular embodiment, the normalized chords have nominal values within the normalized chord ranges set forth in Table 3 for the entire aircraft (i.e. normalized half-span from 0 to 1.0).

In a particular embodiment, the nominal values for the normalized chord in the region defined by the normalized half-span values from 0.1 to 0.2 define a slope or rate of change selected from the following values: at least −3.5; at least −4.3; from −3.5 to −4.3; from −3.5 to −5.1; from −4.3 to −5.1. In addition or alternately, the nominal values for the normalized chord in the overlapping region defined by normalized half-span values from 0.1 to 0.3 define a slope or rate of change selected from the following values: at least −2.4; at least −2.8; from −2.4 to −2.8; from −2.4 to −3.2; from −2.8 to −3.2. It is understood that the expression "at least" refers to the absolute value of the rate of change, i.e. to include greater rates of changes; in the case of a negative value (reduction), "at least −3.5" includes negative rates having a greater absolute value such as for example −3.6, −4.0, etc. The rate of change corresponds to the dimensionless ratio of the variation in normalized chord to the variation in normalized span; for example, a rate of change of −3.5 corresponds to a reduction of 35% in the normalized chord value over a region of 0.1 (10%) normalized span. The normalized chord distribution corresponding to any of these slopes or rates of change may follow part of Table 1, Table 2 or Table 3, the whole of Table 1, Table 2 or Table 3, or be different from Table 1, Table 2 and Table 3.

In a particular embodiment, the thickness ratios have nominal values within the thickness ratio ranges set forth in Table 1 for at least the profile sections having normalized half-span values from 0 to 0.2; in a particular embodiment, the thickness ratios have nominal values within the thickness ratio ranges set forth in Table 1 for at least the profile sections having normalized half-span values from 0 to 0.3. In a particular embodiment, the thickness ratios have nominal values within the thickness ratio ranges set forth in Table 1 for the entire aircraft (i.e. normalized half-span from 0 to 1.0).

In a particular embodiment, the thickness ratios have nominal values within the thickness ratio ranges set forth in Table 2 for at least the profile sections having normalized half-span values from 0 to 0.2; in a particular embodiment, the thickness ratios have nominal values within the thickness ratio ranges set forth in Table 2 for at least the profile sections having normalized half-span values from 0 to 0.3. In a particular embodiment, the thickness ratios have nominal values within the thickness ratio ranges set forth in Table 2 for the entire aircraft (i.e. normalized half-span from 0 to 1.0).

In a particular embodiment, the thickness ratios have nominal values within the thickness ratio ranges set forth in Table 3 for at least the profile sections having normalized half-span values from 0 to 0.2; in a particular embodiment, the thickness ratios have nominal values within the thickness ratio ranges set forth in Table 3 for at least the profile sections having normalized half-span values from 0 to 0.3. In a particular embodiment, the thickness ratios have nominal values within the thickness ratio ranges set forth in Table 3 for the entire aircraft (i.e. normalized half-span from 0 to 1.0).

In a particular embodiment, the nominal values for the thickness ratio in the region defined by the normalized half-span values from 0.1 to 0.2 define a slope or rate of change selected from the following values: at least −0.27; at least −0.49; from −0.27 to −0.49; from −0.27 to −0.72; from −0.49 to −0.72. In addition or alternately, the nominal values for the thickness ratio in the overlapping region defined by the normalized half-span values from 0.1 to 0.3 define a slope or rate of change selected from the following values: at least −0.28; at least −0.37; from −0.28 to −0.37; from −0.28 to −0.45; from −0.37 to −0.45. It is understood that the expression "at least" refers to the absolute value of the rate of change, i.e. to include greater rates of changes; in the case of a negative value (reduction), "at least −0.28" includes negative rates having a greater absolute value such as for example −0.3, −0.4, etc. The rate of change corresponds to the dimensionless ratio of the variation in thickness ratio to the variation in normalized span; for example, a rate of change of −0.28 corresponds to a reduction of 2.8% in the thickness ratio value over a region of 0.1 (10%) normalized span. The thickness ratio distribution corresponding to any of these slopes or rates of change may follow part of Table 1, Table 2 or Table 3, the whole of Table 1, Table 2 or Table 3, or be different from Table 1, Table 2 and Table 3.

In a particular embodiment, the thickness ratio at the centerline 20 has a nominal value of at least 16%; the remainder of the thickness ratio distribution may follow part of Table 1, Table 2 or Table 3, the whole of Table 1, Table 2 or Table 3, or be different from Table 1, Table 2 and Table 3. This may be combined with the normalized chords having nominal values within the normalized chord ranges set forth in Table 1, Table 2 or Table 3 for any of the ranges of normalized half-span mentioned above, for example for at least the profile sections having normalized half-span values from 0.15 to 0.3, or from 0.15 to 0.5, or for from 0 to 1.0.

It is understood that any nominal value and/or rate of change for the normalized chords mentioned above may be combined with any nominal value and/or rate of change for the thickness ratios mentioned above. For example, in a particular embodiment, the normalized chords have nominal values within the normalized chord ranges set forth in Table 1 for at least the profile sections having normalized half-span values from 0.15 to 0.3 and the thickness ratios have nominal values within the thickness ratio ranges set forth in Table 1 for at least the profile sections having normalized half-span values from 0 to 0.2. All other possible combinations may also be used.

Figure 9:
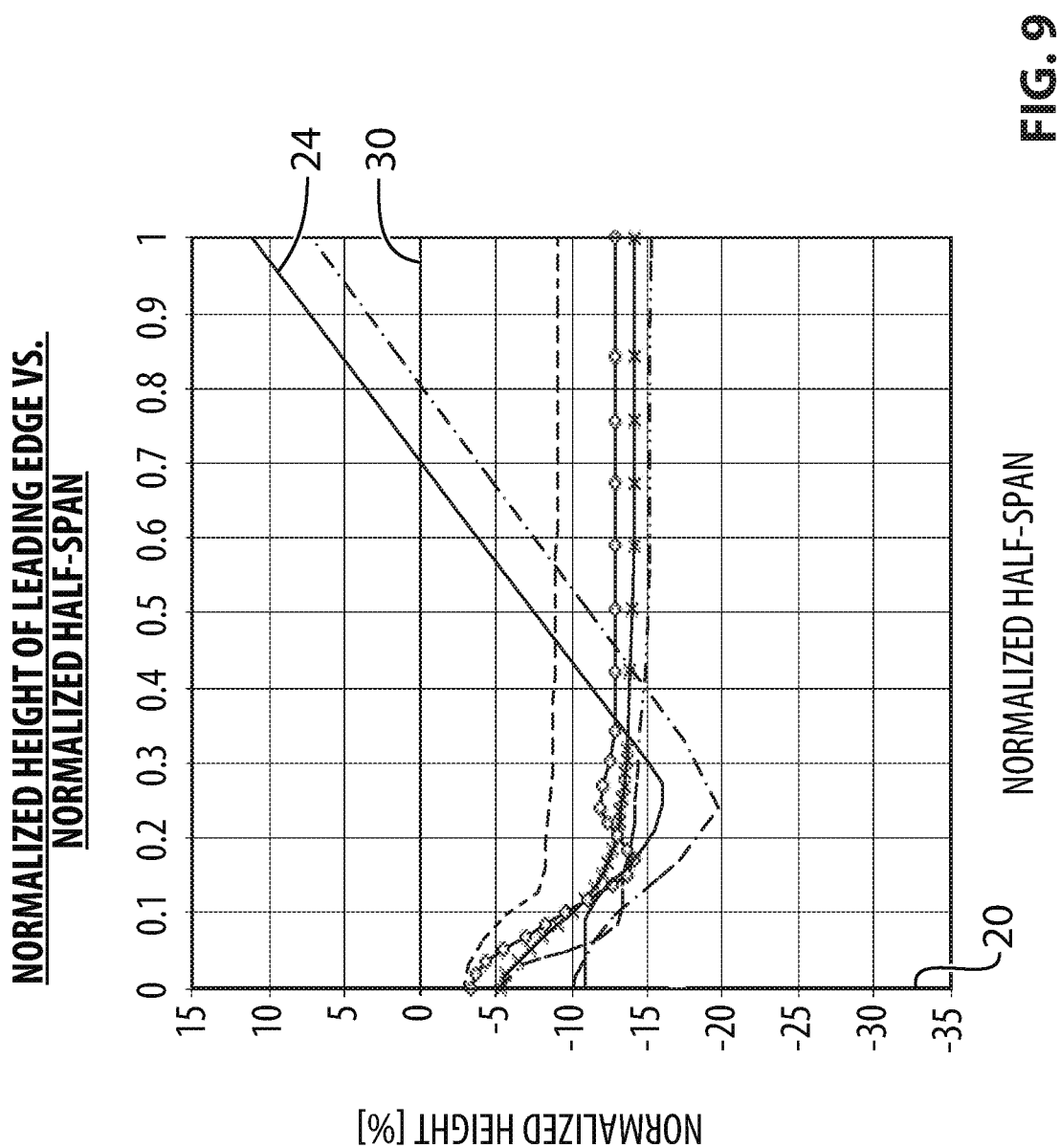
FIG. 9 is a graph showing an example of normalized leading edge height distribution as a function of normalized half-span for the aircraft of FIG. 1, in accordance with a particular embodiment.
Figure 10:
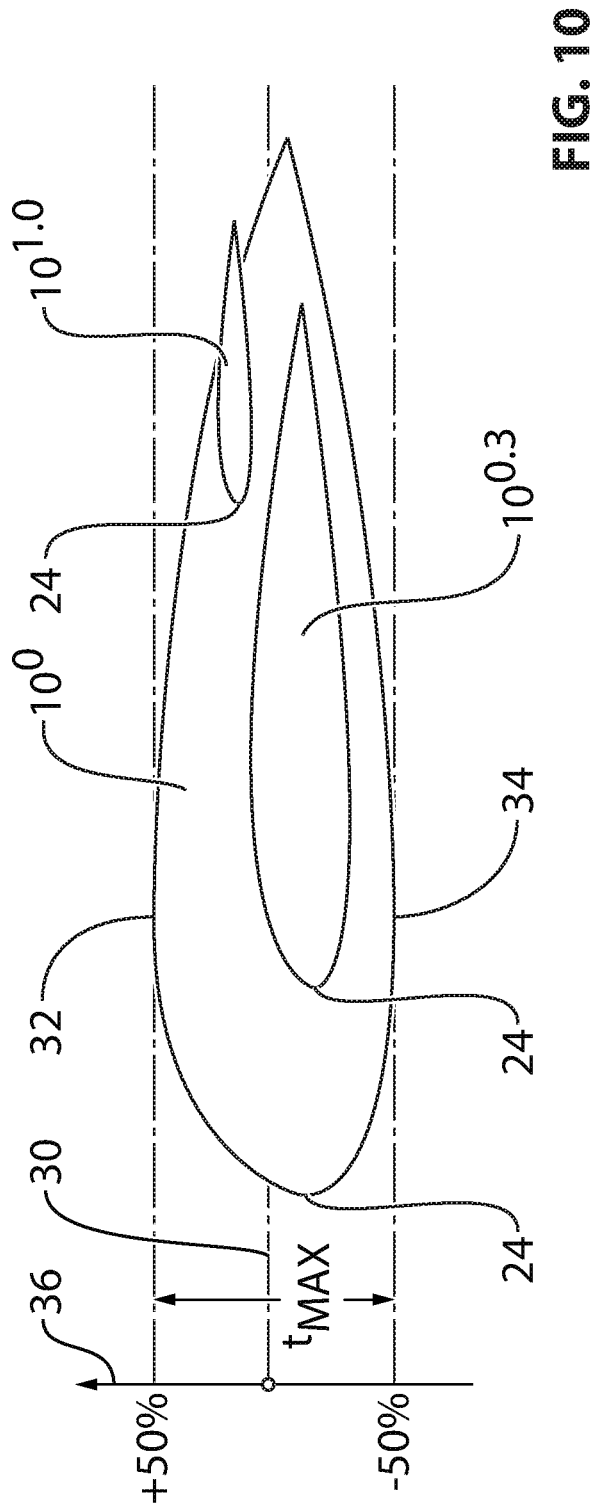
FIG. 10 is a schematic side view of three different profile sections of the aircraft, illustrating the normalized leading edge height shown by FIG. 9.

Referring to FIGS. 9-10, in a particular embodiment, the wings 14 have a low position on the center body 12; this may help maximize the available flat floor area in the cabin. FIG. 9 shows an example of the distribution of the normalized height of the leading edge 24 as a function of the normalized half-span. FIG. 10 illustrates how the normalized height of the leading edge 24 is measured.

As can be seen from FIG. 10, the maximum thickness ($t_{MAX}$), or height, of the center body 12 is defined by the profile section $10^0$ of the longitudinal centerline, i.e. at the normalized half-span value of 0. A mid-point reference line 30 extending in the plane of the profile, fore-to-aft in relation to the center body 12, can be defined perpendicularly to the direction 36 defined by the maximum thickness ($t_{MAX}$) at a mid-point of the maximum thickness, i.e. at mid distance between opposed top and bottom surfaces 32, 34 of the center body 12 where the maximum thickness is defined. The vertical position or height of elements of the aircraft 10 may be indicated with respect to this mid-point reference line 30, by their distance measured along the direction 36 defined by the maximum thickness, within the plane of each profile section. This distance may be indicated in terms of a % of the maximum thickness of the center body, i.e. as a ratio of the distance to the maximum thickness. Accordingly, the center body 12, at the centerline 20 (normalized half-span value of 0), has a normalized height extending between 50% and −50% of the maximum thickness. FIG. 10 also illustrates the profile section $10^{0.3}$ located at the normalized half-span value of 0.3 and the profile section $10^{1.0}$ located at the normalized half-span value of 1.0, to illustrate the evolution of the normalized height of the leading edge 24 along the span direction.

Referring back to FIG. 9, the distribution of the normalized height of the leading edge 24 in accordance with a particular embodiment is shown. The normalized height of the leading edge 24 of the profile section at each normalized half-span value (wing 14 or center body 12) is indicated in reference to the mid-point reference line 30, as a % of the maximum thickness of the center body 12. It can be seen that a significant part of the leading edge 24 is located at a distance of at least 10% of the maximum thickness below the mid-point reference line 30. In some of the embodiment shown, the leading edge 24 remains at a distance of at least 10% of the maximum thickness below the mid-point reference line 30 from the centerline 20 to a normalized half-span value of at least 0.3 (or 30%). Table 4 below sets forth value ranges for the normalized height of the leading edge 24 according to a particular embodiment, which encompass but are not limited to the distributions of FIG. 9:

TABLE 4

| Normalized half-span value | Leading edge normalized height range (%) | |
| --- | --- | --- |
| (dimensionless) | From | To |
| 0.00 | 3.0 | −17.0 |
| 0.05 | 2.0 | −18.0 |
| 0.10 | 1.0 | −21.0 |
| 0.15 | −1.0 | −24.0 |
| 0.20 | −2.0 | −27.0 |
| 0.25 | −3.0 | −30.0 |
| 0.30 | −3.0 | −30.0 |
| 0.35 | −2.0 | −30.0 |
| 0.40 | −1.0 | −27.0 |
| 0.45 | 0.0 | −24.0 |

Table 5 below sets forth smaller value ranges for the normalized height of the leading edge 24 according to another particular embodiment, which encompass at least some of the distributions of FIG. 9:

TABLE 5

| Normalized half-span value | Leading edge normalized height range (%) | |
| --- | --- | --- |
| (dimensionless) | From | To |
| 0.00 | 1.0 | −15.0 |
| 0.05 | 0.0 | −16.0 |
| 0.10 | −1.0 | −19.0 |
| 0.15 | −3.0 | −22.0 |
| 0.20 | −5.0 | −25.0 |
| 0.25 | −6.0 | −26.0 |
| 0.30 | −6.0 | −26.0 |
| 0.35 | −5.0 | −24.0 |
| 0.40 | −3.0 | −22.0 |
| 0.45 | −1.0 | −20.0 |

In a particular embodiment, the normalized heights of the leading edges 24 have nominal values within the leading edge normalized height ranges set forth in Table 4 for at least the profile sections having normalized half-span values from 0 to 0.3; in a particular embodiment, the normalized heights of the leading edges 24 have nominal values within the leading edge normalized height ranges set forth in Table 4 for at least the profile sections having normalized half-span values from 0 to 0.4. In a particular embodiment, the normalized heights of the leading edge 24 have nominal values within the leading edge normalized height ranges set forth in Table 4 for the entire table (i.e. normalized half-span from 0 to 0.45).

In a particular embodiment, the normalized heights of the leading edges 24 have nominal values within the leading edge normalized height ranges set forth in Table 5 for at least the profile sections having normalized half-span values from 0 to 0.3; in a particular embodiment, the normalized heights of the leading edges 24 have nominal values within the leading edge normalized height ranges set forth in Table 5 for at least the profile sections having normalized half-span values from 0 to 0.4. In a particular embodiment, the normalized heights of the leading edge 24 have nominal values within the leading edge normalized height ranges set forth in Table 5 for the entire table (i.e. normalized half-span from 0 to 0.45).

In a particular embodiment, the wing position shown helps obtain a sufficient flat floor area in the cabin, while minimizing the operational and design impacts of having a low wing position.

It is understood that alternate normalized heights for the leading edge 24 are possible, and that the values are provided as an example only.

In a particular embodiment, the aircraft profile discussed herein allows for improved fuel efficiency, emissions, operating costs, external storage capacity and/or noise management when compared to a tubular aircraft having a similar cabin usable volume. The blended wing body shape additionally allows for new seat and cabin design configurations within a relatively small cabin usable volume.

In a particular embodiment, the shape of the center body allows to approach the ideal elliptical lift distribution with respect to the minimization of drag forces. Significant drag reduction may allow for fuel burn reduction which can lead to savings in operating costs and may help achieve design weight reduction, which in turn may lead to a need for smaller engines and other systems.

It is understood that any combination or sub-combination of the elements of the different embodiments is within the scope of this disclosure. While the methods and systems described herein have been described and shown with reference to particular steps performed in a particular order, it will be understood that these steps may be combined, sub-divided or reordered to form an equivalent method without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A blended wing body aircraft comprising:
an airfoil shaped center body; and
a pair of wings extending from opposed sides of the center body;
wherein the aircraft has a span direction, and a maximum half-span length defined along the span direction from a centerline of the center body to a tip of one of the wings;
wherein a normalized half-span value for each profile section of the aircraft is defined by a ratio between a distance along the span direction from the centerline to the profile section, and the maximum half-span length;
wherein each profile section of the aircraft has a thickness ratio defined by a ratio between a thickness of the profile section and a chord length of the profile section, the thickness ratio having a nominal value within the thickness ratio range set forth in Table 1 for at least each profile section corresponding to the normalized half-span values from 0 to 0.2.

2. The blended wing body aircraft according to claim 1, wherein the aircraft has a maximum chord length defined longitudinally by the center body, and wherein each profile section of the aircraft has a normalized chord defined by a ratio between the chord length of the profile section and the maximum chord length, the normalized chord having a nominal value within the normalized chord range set forth in Table 1 for at least each profile section corresponding to the normalized half-span values from 0.15 to 0.3.

3. The blended wing body aircraft according to claim 2, wherein the nominal value of the normalized chord is within the normalized chord range set forth in Table 1 for at least each profile section corresponding to the normalized half-span values from 0.15 to 0.5.

4. The blended wing body aircraft according to claim 2, wherein the nominal value of the normalized chord is within the normalized chord range set forth in Table 1 for all the normalized half-span values.

5. The blended wing body aircraft according to claim 2, wherein the nominal value of the normalized chord is within the normalized chord range set forth in Table 1 and the nominal value of the thickness ratio is within the thickness ratio range set forth Table 1 for all the normalized half-span values.

6. The blended wing body aircraft according to claim 2, wherein the nominal value of the normalized chord is within the normalized chord range set forth in Table 2 for at least each profile section corresponding to the normalized half-span values from 0.15 to 0.3.

7. The blended wing body aircraft according to claim 2, wherein the nominal value of the normalized chord is within the normalized chord range set forth in Table 3 for at least each profile section corresponding to the normalized half-span values from 0.15 to 0.3.

8. The blended wing body aircraft according to claim 1, wherein the nominal value of the thickness ratio is within the thickness ratio range set forth in Table 1 for at least each profile section corresponding to the normalized half-span values from 0 to 0.3.

9. The blended wing body aircraft according to claim 1, wherein the nominal value of the thickness ratio is within the thickness ratio range set forth in Table 1 for all the normalized half-span values.

10. The blended wing body aircraft according to claim 1, wherein the nominal value of the thickness ratio is within the thickness ratio range set forth in Table 2 for at least each profile section corresponding to the normalized half-span values from 0 to 0.2.

11. The blended wing body aircraft according to claim 1, wherein the nominal value of the thickness ratio is within the thickness ratio range set forth in Table 3 for at least each profile section corresponding to the normalized half-span values from 0 to 0.2.

12. The blended wing body aircraft according to claim 1, wherein the center body includes an interior cabin having a usable volume of at most 4500 ft$^3$.

13. The blended wing body aircraft according to claim 12, wherein the interior cabin has a maximum length defined longitudinally and a maximum width defined perpendicularly to the maximum length, a cabin aspect ratio of the maximum length to the maximum width being at most 4.

14. The blended wing body aircraft according to claim 1, wherein a reference line is defined perpendicularly to a direction defined by a maximum thickness of the center body at a mid-point of the maximum thickness, the reference line extending fore-to-aft in relation to the center body, a part of each of the wings having a leading edge located a first distance below the reference line, the first distance being measured along the direction defined by the maximum thickness and corresponding to at least 10% of the maximum thickness.

15. The blended wing body aircraft according to claim 1, wherein:
   a reference line is defined perpendicularly to a direction defined by a maximum thickness of the center body at a mid-point of the maximum thickness, the reference line extending fore-to-aft in relation to the center body; and
   each profile section of the aircraft has a leading edge having a normalized height with respect to the reference line, the normalized height corresponding to a ratio of a distance from the reference line being measured along the direction defined by the maximum thickness to the maximum thickness, the normalized height having a nominal value within the leading edge normalized height range set forth in Table 4 for at least each profile section corresponding to the normalized half-span values from 0 to 0.3.

16. A blended wing body aircraft comprising:
   an airfoil shaped center body; and
   a pair of wings extending from opposed sides of the center body;
   wherein the aircraft has a maximum chord length defined longitudinally by the center body;
   wherein the aircraft has a span direction, and a maximum half-span length defined along the span direction from a centerline of the center body to a tip of one of the wings;
   wherein a normalized half-span value for each profile section of the aircraft is defined by a ratio between a distance along the span direction from the centerline to the profile section, and the maximum half-span length;
   wherein each profile section of the aircraft has a normalized chord defined by a ratio between a chord length of the profile section and the maximum chord length, the normalized chord having a nominal value within the normalized chord range set forth in Table 1 for at least each profile section corresponding to the normalized half-span values from 0.15 to 0.3; and
   wherein a ratio between a maximum thickness of the center body at the centerline and the chord length along the centerline has a nominal value of at least 16%.

17. The blended wing body aircraft according to claim 16, wherein the nominal value of the normalized chord is within the normalized chord range set forth in Table 1 for at least each profile section corresponding to the normalized half-span values from 0.15 to 0.5.

18. The blended wing body aircraft according to claim 16, wherein the nominal value of the normalized chord is within the normalized chord range set forth in Table 1 for all the normalized half-span values.

19. The blended wing body aircraft according to claim 16, wherein the nominal value of the normalized chord is within the normalized chord range set forth in Table 2 for at least each profile section corresponding to the normalized half-span values from 0.15 to 0.3.

20. The blended wing body aircraft according to claim 16, wherein the nominal value of the normalized chord is within the normalized chord range set forth in Table 3 for at least each profile section corresponding to the normalized half-span values from 0.15 to 0.3.

21. The blended wing body aircraft according to claim 16, wherein the center body includes an interior cabin having a usable volume of at most 4500 ft$^3$.

22. The blended wing body aircraft according to claim 21, wherein the interior cabin has a maximum length defined longitudinally and a maximum width defined perpendicularly to the maximum length, a cabin aspect ratio of the maximum length to the maximum width being at most 4.

23. The blended wing body aircraft according to claim 16, wherein a reference line is defined perpendicularly to a direction defined by a maximum thickness of the center body at a mid-point of the maximum thickness, a part of each of the wings having a leading edge located a first distance below the reference line, the first distance being measured along the direction defined by the maximum thickness and corresponding to at least 10% of the maximum thickness.

24. The blended wing body aircraft according to claim 16, wherein:
   a reference line is defined perpendicularly to a direction defined by a maximum thickness of the center body at a mid-point of the maximum thickness, the reference line extending fore-to-aft in relation to the center body; and
   each profile section of the aircraft has a leading edge having a normalized height with respect to the reference line, the normalized height corresponding to a ratio of a distance from the reference line being measured along the direction defined by the maximum thickness to the maximum thickness, the normalized height having a nominal value within the leading edge normalized height range set forth in Table 4 for at least each profile section corresponding to the normalized half-span values from 0 to 0.3.

* * * * *